United States Patent
Ruhman et al.

(10) Patent No.: US 6,545,060 B1
(45) Date of Patent: Apr. 8, 2003

(54) MAGNETOSTRICTION-BASED ULTRASOUND IN RUBBER DEVULCANIZATION AND RELATED PROCESSES

(75) Inventors: Andrey Aleksandrovich Ruhman, Moscow (RU); Vsevolod Fedosievich Kasanzev, Moscow (RU); Vyacheslav Nikolaevich Alenitchev, Moscow (RU); Sergei Aleksandrovich Neduzhiy, Moscow (RU); Tom Faust, Corte Madera, CA (US)

(73) Assignee: Redwood Rubber LLC, Corte Madera, CA (US)

( * ) Notice: Subject to any disclaimer, the term of this patent is extended or adjusted under 35 U.S.C. 154(b) by 0 days.

(21) Appl. No.: 09/679,757

(22) Filed: Oct. 5, 2000

Related U.S. Application Data

(63) Continuation of application No. 09/308,463, filed as application No. PCT/US97/21321 on Nov. 21, 1997, now abandoned.
(60) Provisional application No. 60/031,908, filed on Nov. 22, 1996.

(51) Int. Cl.$^7$ ............................................. C08L 11/10
(52) U.S. Cl. ........................ 521/41; 521/45.5; 264/912
(58) Field of Search ..................... 521/40, 40.5, 41, 521/45.5; 204/157.15, 157.42

(56) References Cited

U.S. PATENT DOCUMENTS

| | | | | |
|---|---|---|---|---|
| 4,168,295 A | * | 9/1979 | Sawyer | 422/111 |
| 4,369,100 A | * | 1/1983 | Sawyer | 204/157.1 |
| 5,798,394 A | * | 8/1998 | Myers et al. | 521/42.5 |
| 5,799,880 A | * | 9/1998 | Roberson et al. | 241/1 |
| 5,955,035 A | * | 9/1999 | Dinzburg et al. | 422/128 |

FOREIGN PATENT DOCUMENTS

WO    WO-95/24999 A1 * 9/1995

* cited by examiner

Primary Examiner—Edward J. Cain
Assistant Examiner—Katarzyna Wyrozebski-Lee
(74) Attorney, Agent, or Firm—Stephen E. Baldwin

(57) ABSTRACT

The breakdown of crosslinked elastomers, including the devulcanization of crumb rubber, is achieved by exposing the elastomers to ultrasonic vibrations induced by magnetostriction transducers. The transducers are capable of a higher power output than ultrasound produced by piezoelectric transducers, and are able to withstand high temperatures and high-frequency vibrations to a significantly better degree.

11 Claims, 8 Drawing Sheets

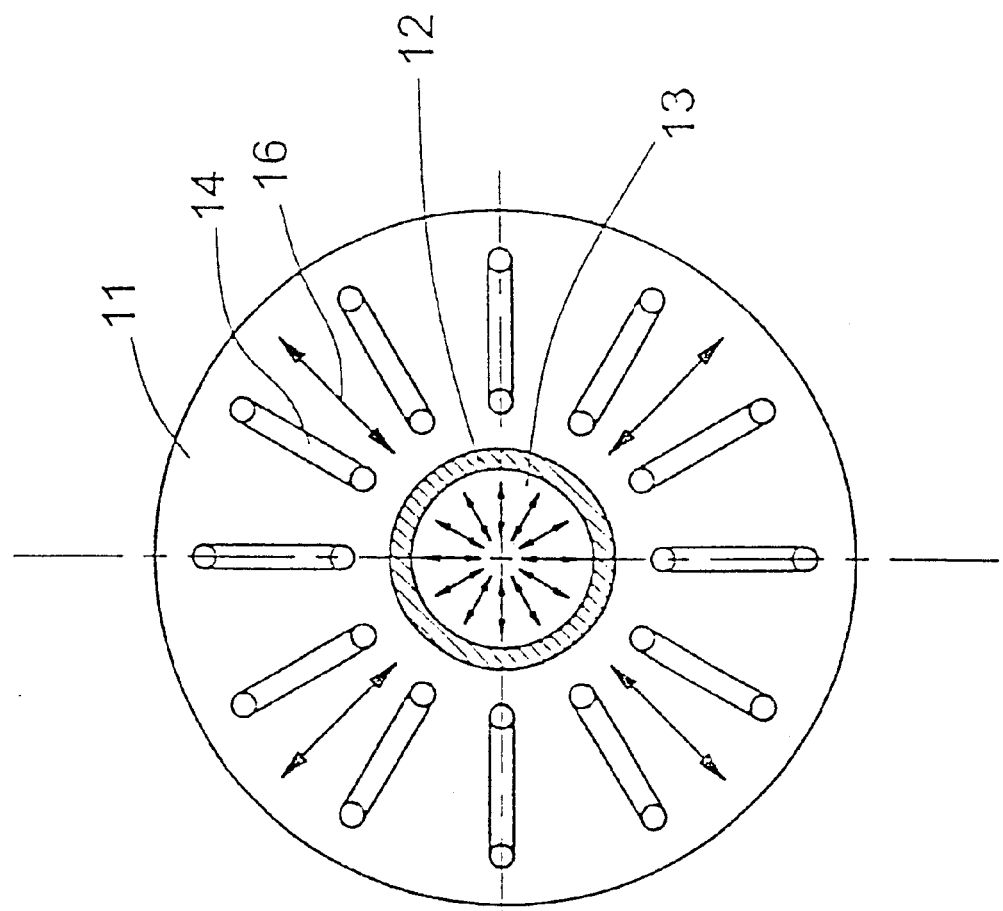
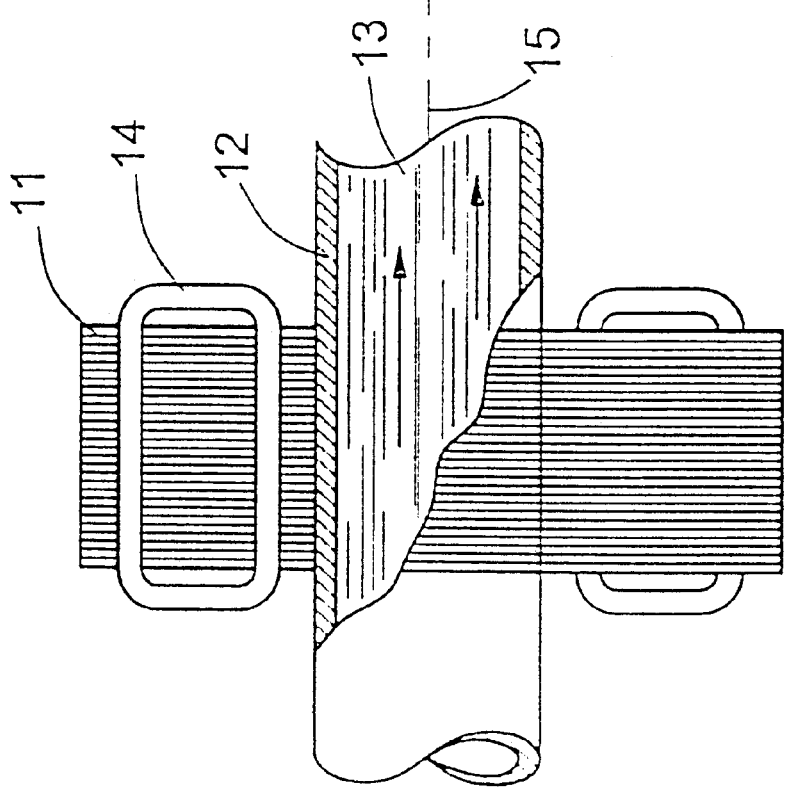
Fig. 1b
Fig. 1a

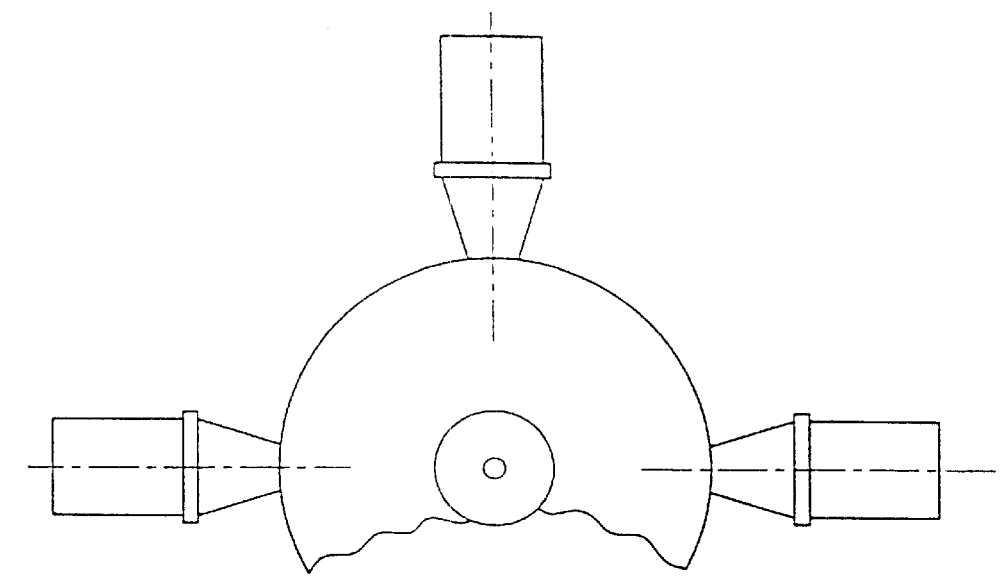
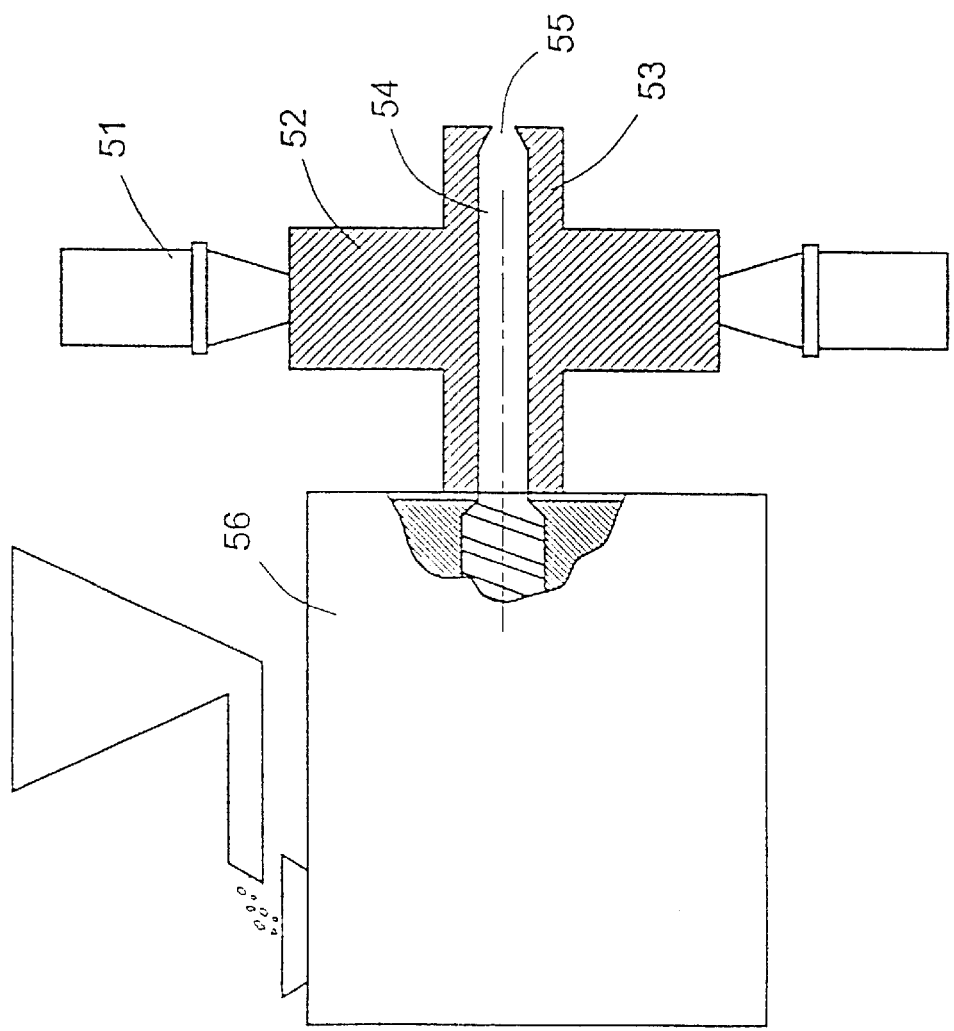
Fig. 5b
Fig. 5a

MAGNETOSTRICTION-BASED ULTRASOUND IN RUBBER DEVULCANIZATION AND RELATED PROCESSES

CROSS REFERENCE TO RELATED DOCUMENTS

This application is a continuation of Ser. No. 09/308,463 filed Oct. 14, 1999 now abandoned, which is a 371 of PCT/US97/21321 filed Nov. 21, 1997.

This specification contains subject matter in common with provisional patent application No. 60/031,908, filed Nov. 22, 1996, and with Disclosure Document No. 378009 entitled "MAGNETOSTRICTIVE DEVULCANIZATION DEVICE" submitted by Thomas Faust to the United States Patent and Trademark Office on Jul. 10, 1995, and hereby claims all benefits legally available from said provisional patent application and said disclosure document. In addition, the contents of both documents are incorporated herein by reference.

BACKGROUND OF THE INVENTION

Crumb rubber from scrap tires is used as an extender in rubber products. Tires for example use about 2–3% recycled rubber. However, inert crumb rubber, i.e., untreated vulcanized crumb rubber, significantly reduces the physical strength of rubber products. For this reason, inert crumb rubber is only used in products which also contain other polymers that cause the crumb rubber particles to adhere to one another. Furthermore, the products in which crumb rubber is typically used are those that do not encounter dynamic stress in use and do not require high tensile strength. Thus, crumb rubber is used mostly for such items as doormats, pads, and soaker hoses. If the adhesive polymer were not needed, molded objects could be made with up to 100% crumb rubber. Nevertheless, the processing of crumb rubber to make it suitable for use at such high levels is uneconomical due to high costs.

One process for using crumb rubber and increasing its strength involves combining 100 PHR of crumb rubber with 6 PHR of virgin rubber and 2–4 PHR of a mixture of plasticizer and softening chemical such as sulfides. ("PHR" denotes "parts per hundred ratio", i.e., parts per 100 parts of devulcanized tire crumb rubber, on a volume basis.) The formulation is milled in a Banbury mixer or an extruder, then milled, rolled and aged to permit the sulfides to penetrate the rubber. Paraffin distillate has also been used as the softening agent. Solvents containing devulcanizing agents such as halogenated organics, organometallic complexes, acids, guanidines, and phenylamines, are mixed with crumb rubber to effect a surface devulcanization. These formulations and the methods of treating them entail costs of $0.15 to $0.42 per pound above the cost of the crumb rubber.

Another approach has been to treat the crumb rubber particles with chlorine gas. Crumb rubber treated in this manner has been used as an extender in elastomeric polyurethanes for such applications as industrial tires, wheels and automotive components.

Devulcanization of crumb rubber permits it to be used in a wider range of formulations and applications. When devulcanized elastomers are used, at least 70% devulcanization is generally considered necessary. Devulcanized recycled elastomers that are manufactured without chemical additives are preferred because they are easier to compound and to mold. The steam autoclave process can deliver unadulterated recycled rubber.

Another method that has been proposed for devulcanization is ultrasound. Ultrasound devulcanization of elastomers is a known process. As documented by Basedow and Ebert, in "Ultrasound Degradation of Polymers in Solution," *Advances in Polymer Science* 22: 88 (1977), the concept of using ultrasonic waves to break elastomeric chemical bonds of C—C, S—S, S—S—S, and C—S has been known since the early 1950's.

U.S. Pat. No. 3,725,314 (Pelofsky, Apr. 3, 1973) discloses immersing rubber in a liquid hydrocarbon and exposing the immersed rubber to ultrasonic energy at frequencies of from 10 to 40 kHz with a power intensity greater than 100 watts per square centimeter of material. By moving the material continuously past the ultrasonic energy source, hot spots are supposedly avoided. This method contemplates using a piezoelectric ultrasonic device and has not been commercialized, since no equipment is available for practicing this method on a commercial scale.

U.S. Pat. No. 4,548,771 (Senapati et al., Oct. 22, 1985) discloses an ultrasonic vulcanization process in which chemical bonds are formed in virgin elastomers at 200–300° F. under a pressure of 500–100 psi, for periods up to ten minutes for each ⅛-inch thickness of the material. The energy intensity is 20–200 watts per square inch, and the ultrasonic energy is 10–100 kHz. Like the method of the Pelofsky patent, this method contemplates using a piezoelectric ultrasonic device and has not been commercialized.

U.S. Pat. No. 4,104,205 (Novotny et al., Aug. 1, 1978) discloses a continuous process for breaking rubber bonds by microwave devulcanization in a continuously moving steel auger. The process was satisfactory on a laboratory scale but has never been commercialized.

U.S. Pat. No. 5,284,625 (Isayev et al., Feb. 8, 1994) discloses the placement of either single or multiple units of piezoelectric ultrasonic units in an extruder for continuous devulcanization of tire crumb rubber. A study in which this apparatus was used was reported by Mason, T. J., *Ultrasonics* 30(3): 192–196 (1992), who concluded that the apparatus would not work successfully due to hot spots and cavitation. Here as well, the limitations of piezoelectric ultrasound prohibit this method from being practiced economically on a commercial scale.

In the apparatus tested by Mason, an ultrasound horn with a piezoelectric transducer was placed within an extruder. When the device was scaled up by a harness that coupled several thousand piezoceramic ultrasound devices, the piezoceramic crystals disintegrated. This indicates that the apparatus disclosed in the Isayev et al. patent is only suitable for laboratory scale processes and is not feasible for commercial operations that require large throughputs. The disclosure in the Isayev et al. patent is similar to a disclosure of a uranium leaching unit in U.S. Pat. No. 4,071,225 (Holl, Jan. 31, 1978), by using seventy small 30-watt piezoelectric units to generate a total field of 2,000 watts. The effort described by Holl has never been successfully practiced as a commercial process.

SUMMARY OF THE INVENTION

It has now been discovered that ultrasonic vibrations induced by a magnetostriction transducer can be used successfully to achieve the dissociation of the carbon-sulfur and sulfur-sulfur crosslinking bonds of a vulcanized elastomer to achieve devulcanization. In a continuous flow process well adapted to the treatment of crumb rubber as the elastomer, the particulate crumb rubber is preferably passed through a conduit in which the ultrasonic vibrations are induced in directions perpendicular to the conduit axis, i.e., perpendicular to the direction of flow of the crumb rubber through the conduit. The directions of the vibrations are preferably radial relative to the conduit axis.

BRIEF DESCRIPTION OF THE DRAWINGS

FIGS. 1a and 1b are side and longitudinal cross sections, respectively, of a portion of a reaction apparatus showing a pipe vessel and a magnetostrictive transducer, representing one example of a system within the scope of this invention.

FIGS. 5a and 5b are side and longitudinal cross sections, respectively, of a further example of a system implementing the invention, using radial-to-longitudinal conversion.

DETAILED DESCRIPTION OF THE INVENTION AND PREFERRED EMBODIMENTS

Figure 2A:
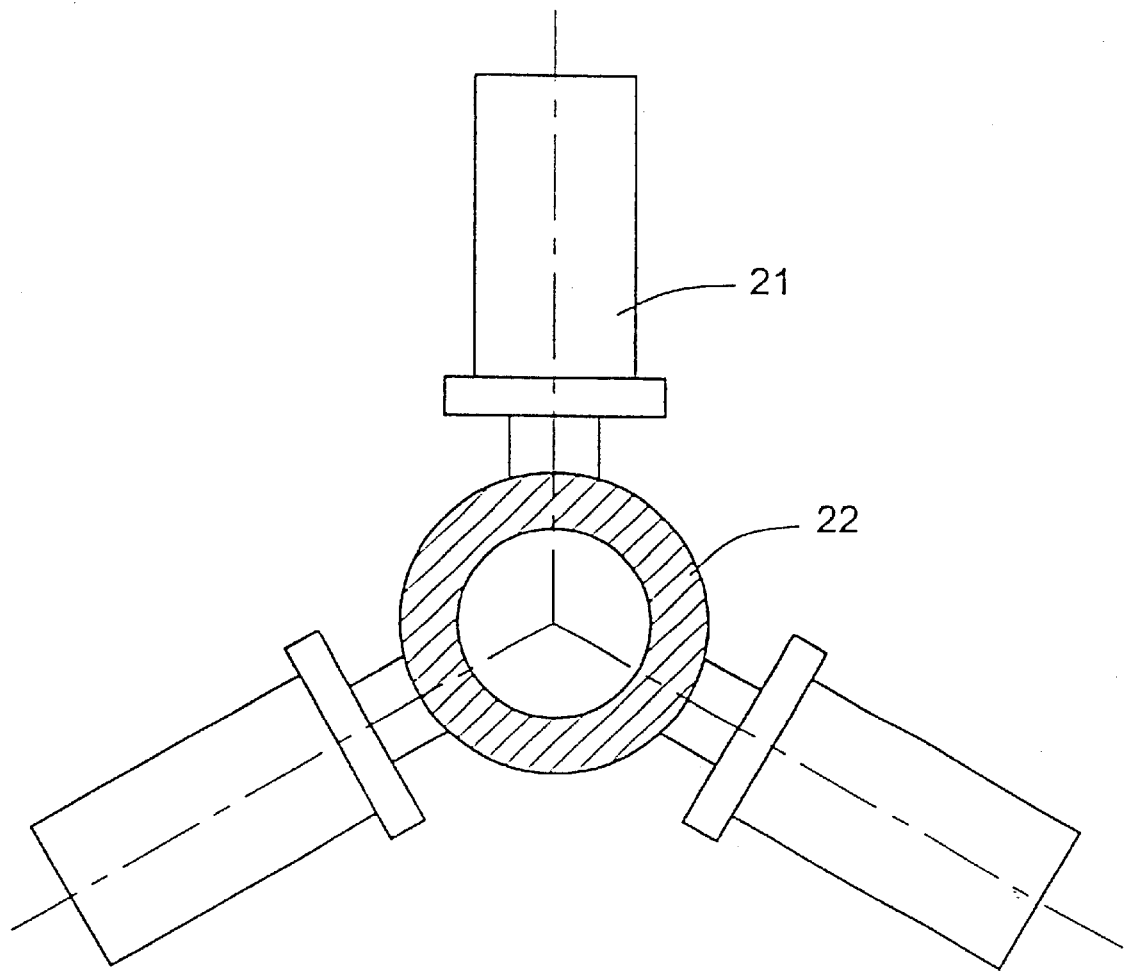
FIGS. 2a and 2b are longitudinal cross sections of pipe with attached rod magnetostrictive transducers, as alternatives to the arrangement shown in FIGS. 1a and 1b.

Magnetostriction transducers are known and commercially available, as are the parameters of operation of the transducers and their methods of use. These parameters and methods can vary widely in the practice of this invention, although certain ranges are preferred. A preferred range of magnetostrictive ultrasound power, for example, is about 15,000 to about 180,000 watts. The higher the power to the unit, the more efficient the unit will be in converting electrical energy to mechanical energy. Magnetostrictive units have been constructed that demonstrate 75% efficiency in converting electrical energy to mechanical energy. A preferred frequency range is about 18 to about 30 kHz.

Magnetostriction transducers of various kinds can be used in the practice of this invention. One example is shown in FIGS. 1a and 1b. The transducer is a fagoted cylinder or ring 11 surrounding a circular cross section pipe 12 that serves as the conduit for the flow of the pressurized elastomer 13. Embedded in the fagoted ring are several series of windings 14, each in the form of a loop, each loop lying in a plane that is radially oriented relative to the axis 15 of the pipe, and the various loops distributed at equal intervals around the pipe circumference. Loops of windings arranged in this manner will create ultrasonic waves that oscillate along the radial direction 16, the oscillations continuing around the circumference of the pipe. This is distinct from the longitudinal oscillations (i.e., oscillations along directions parallel to the axis of the pipe) of ultrasonic systems of the prior art. In the radial oscillations of this invention, the amplitudes of the oscillations vary from approximately zero at the axis of the pipe to a maximum value at the periphery of the pipe, but acoustical pressure is maximal on the axis and reduces toward the periphery.

The operating frequency of the transducer, the speed of sound in the transducer material, and the average transducer diameter are related by the following equation:

$$\pi \times D = (c/F) \times q_F \tag{1}$$

where
D=average diameter
c=transducer material sound velocity
F=transducer resonance (operating) frequency
$q_F$=1.0 (correction factor)
$\pi$=3.14159

Frequency and sound velocity in the transducer material are dependent on the relative size and the number of openings for the winding wire. It is estimated that at 20 kHz frequency, D=80 mm. The value of the correction factor $q_F$, and hence the resonance frequency calculation, varies with the number and diameter of the openings in the transducer, according to known relations, but differs by not more than 10% from the value of 1.0.

Ring-shaped magnetostriction transducers of the type described above can withstand a power load as high as 1 kW per cm of the thickness 17 of the ring (i.e., the length of the cylinder). Also, the operating frequency in these transducers can be varied by varying the internal diameter of the pipe carrying the elastomer to be treated. Adjustment of the power can be achieved by varying the length of the cylinder. The efficiency of the transducer will vary with the wall thickness of the pipe—the thinner the pipe, the greater the efficiency of energy transfer from the transducer. Furthermore, magnetostriction transducers can be operated without intermediate concentrators or booster transducers.

Figure 2B:
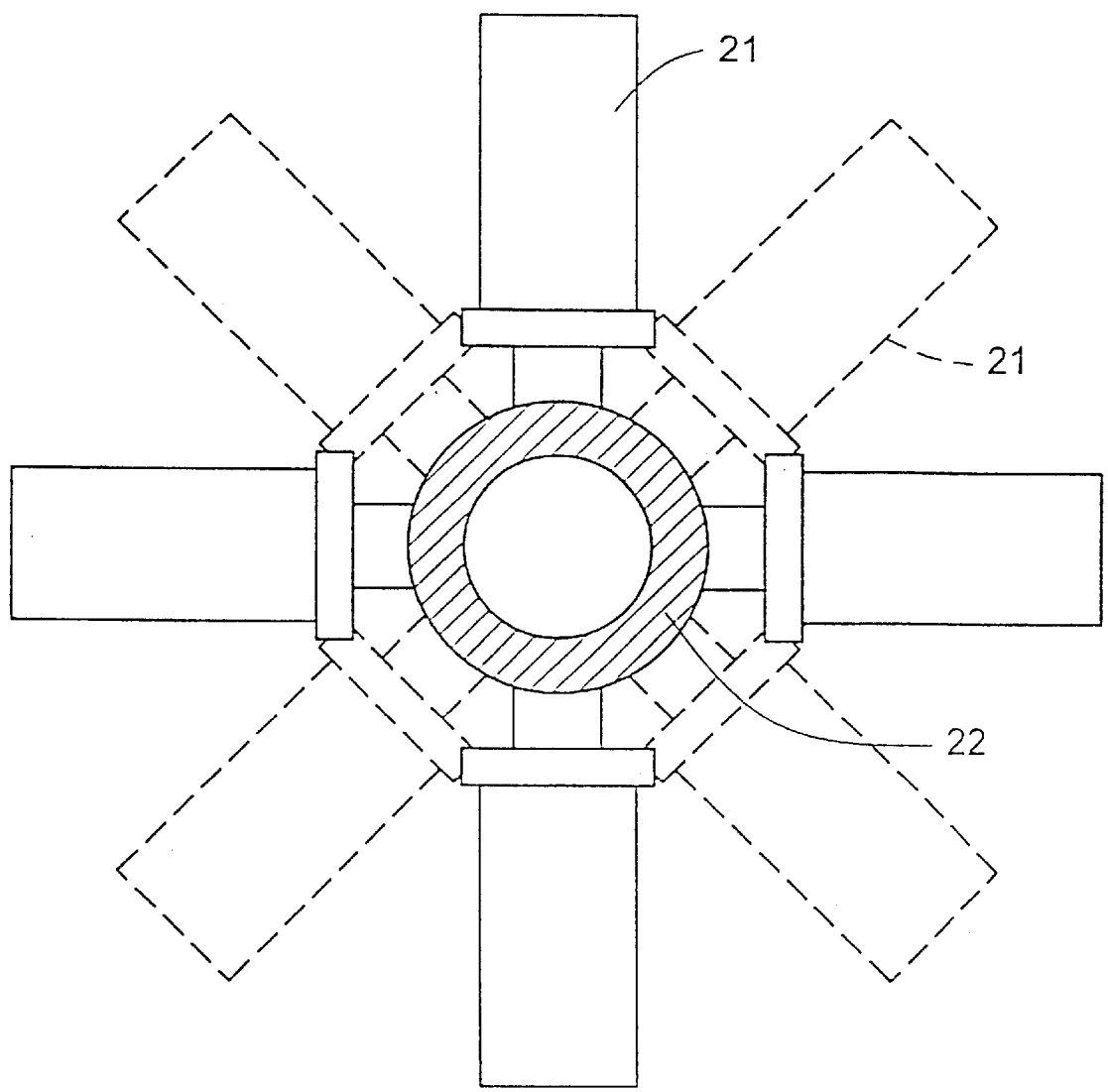

Magnetostriction transducers in the form of rods affixed to the flow pipe exterior rather than cylinders surrounding the pipe can also be used. Examples of how rod transducers can be arranged are shown in FIGS. 2a and 2b. In each of these examples, multiple rod transducers 21—three, four, five or six, for example—are arranged around the periphery of the pipe 22 and are equally spaced, and the pipe can either have a circular cross section or a polygonal cross section with the number of sides equal to the number of transducers.

The transducers can be arranged to produce radial vibrations, or a combination of radial and angular vibrations. Magnetostriction transducers of this type are available commercially from Advanced Sonic Processing Systems, Oxford, Conn., USA; Afalina Corporation, Moscow, Russia; and Extrema, Ames, Iowa, USA. Depending on the type and number of transducers, the operating results can range from a frequency of 20 kHz for a pipe diameter of 7.5 cm (3 inches) to a frequency of 44 kHz for a pipe diameter of 3.4 cm (1.3 inches). A preferred range of operation is 18 to 24 kHz.

In preferred embodiments of the invention, the ultrasonic vibration resulting from the magnetostriction transducers can be optimized and increased by various methods.

One such method is the use of a plurality of transducers arranged in sequence along the length of the flow conduit through which the pressurized elastomer flows. An example is shown in FIG. 2b, where two sets of four rod transducers each are arranged along the pipe axis. The set of four shown in dashed lines is behind the set of four shown in solid lines.

Figure 3:
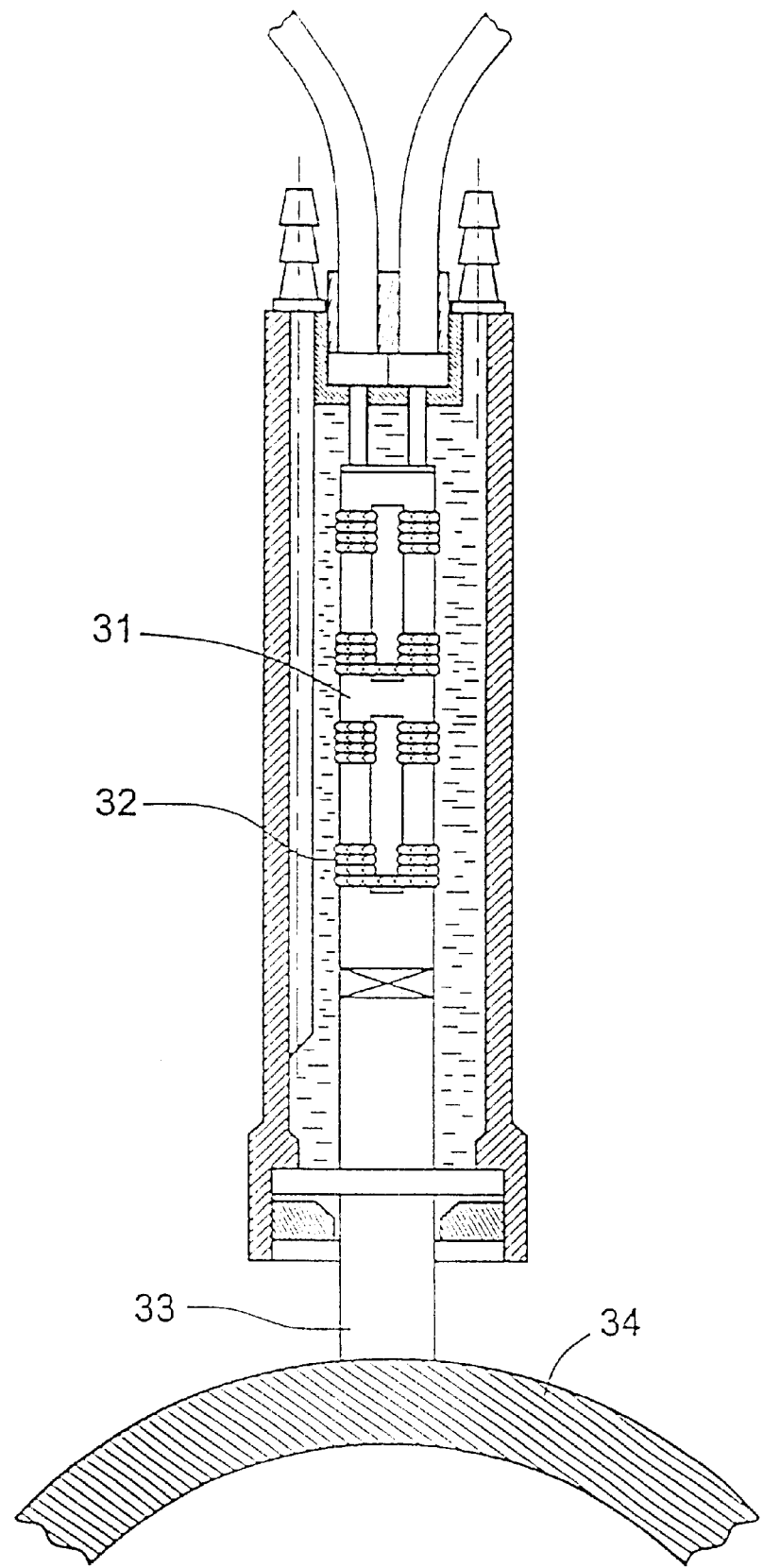
FIG. 3 is a longitudinal cross section of an alternative magnetostrictive transducer attached to the outer surface of a pipe.

The power of a single transducer may be increased as shown in FIG. 3. Two parts of winding-type magnetostrictive transducers 31, each of which is a half-wave unit, can be joined such that their windings 32 are energized in such a way that their vibrations occur in opposing phase.

Alternatively, three such transducers can be arranged in a similar manner, i.e., with each adjacent pair being 180° out of phase with each other. Each transducer is termed an "N-half-wave" transducer, and the acoustic power increase will be proportional to the number of N-half-wave sections. The transducers are silver-brazed to a steel wave guide 33 which in turn is attached to a pipe wall 34. Due to high output amplitude, the transducer materials may be susceptible to fatigue failure. This can be ameliorated however by the use of rare earth metals.

Figures 4A, 4B:
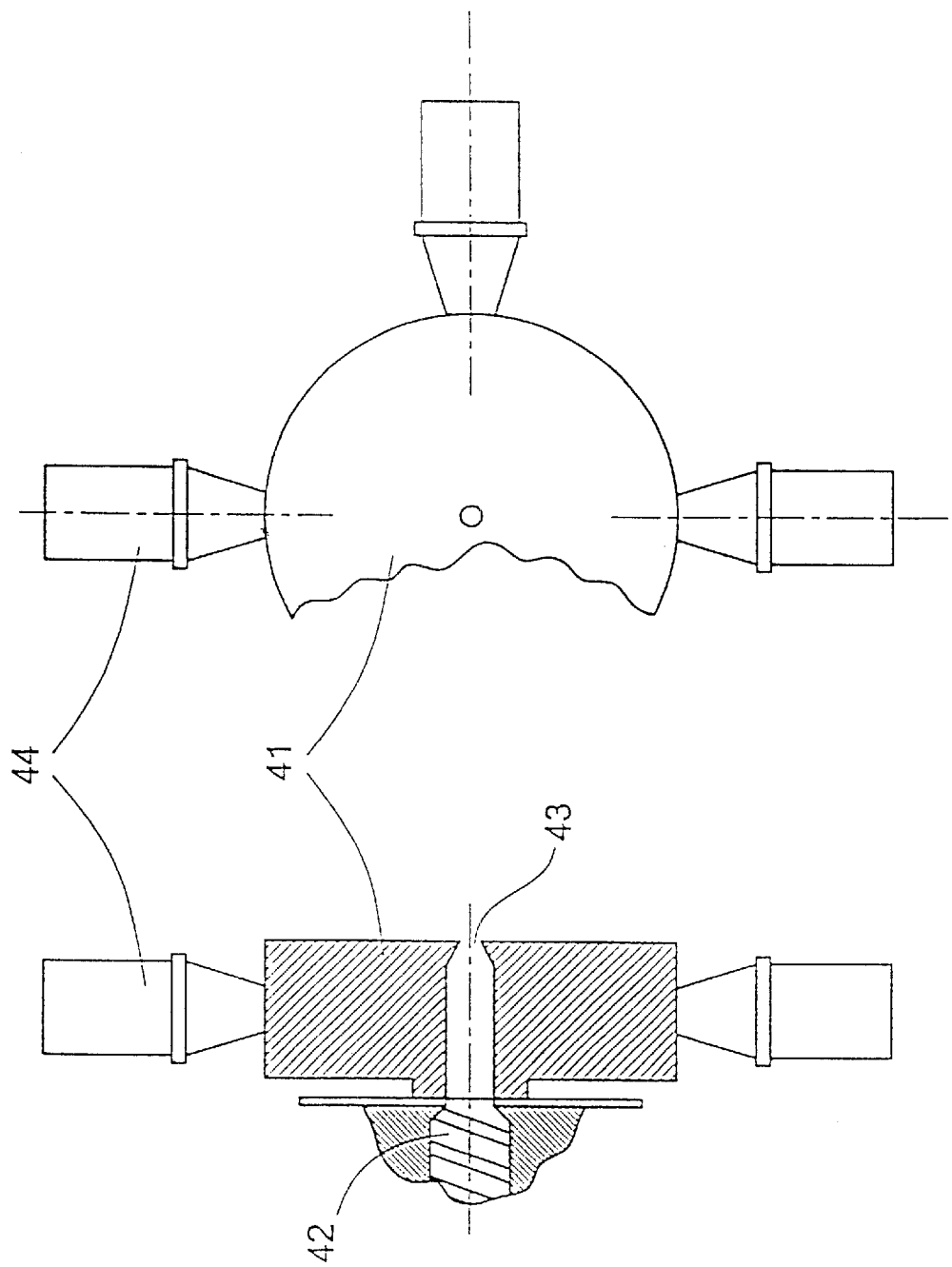
FIGS. 4a and 4b are side and longitudinal cross sections, respectively, of a radially vibrative disk with attached rod magnetostrictive transducers.

A second method of obtaining high output from magnetostrictive transducers is the use of a radially excited disk with an axial hole through which the crumb rubber flows. An example is shown in FIGS. 4a and 4b. The disk 41 is attached to the outlet of the extruder 42. The die 43 is placed in the hole of the disk to control back pressure. Three or more rod transducers 44 are arranged along the periphery of the disk and radially oriented as shown in FIG. 4b. The rod transducers 44 excite radial vibrations in the disk 41. The outer disk diameters D that correspond to the first and second resonance frequencies are defined by Equation (1) above, in which $q_F=2.03$ for the first resonance and $q_F=6.67$ for the second resonance. For titanium alloys, the value of c is 5,100 m/s.

Evaluations performed according to this formula show that at 20 kHz frequency the outer diameter of the disc for the first and second resonances are 0.18 m and 0.05 m, respectively. A typical example in accordance with the arrangement of FIGS. 4a and 4b is one in which at a frequency of 20 kHz, the outer diameter of the disk 41 for the first resonance frequency will be 164 mm. The diameter of a single magnetostriction transducer rod 44, for example, can be about 40 mm. Up to twelve such rods can be located along the external circuit. The power to a single rod can be about 5.0 kW (5,000 watts); for twelve rods, the total power will thus be 60 kW. For the second resonance frequency, the total power can be increased up to 180 kW.

For high mechanical strength and low acoustic losses, the disks are preferably made of titanium alloys, particularly those containing at least 90% homogeneous titanium UT3-D. Rod magnetostriction transducers made of titanium alloys such as TERFENAL-D Composite, PZT-8, MD-1 (super magnetostrictive material) or PERMENDUR that are threaded to securement to discs are easily replaceable and are readily available from commercial suppliers such as those cited above.

A still further alternative is the use of an R-L (radial vibration to longitudinal vibration) ultrasonic unit excited with a few rod transducers arranged along the periphery of the ring and radially oriented, as shown in FIGS. 5a and 5b. The rod transducers 51 excite radial vibrations in the ring 52 in this arrangement, and the ring in turn excites both radial and longitudinal vibrations in the cylinder 53 which has an axial conduit 54 with a die 55. The inlet of this conduit is joined to the outlet of an extruder 56. Crumb rubber is treated as it flows through the conduit. The combined ring part and rod magnetostrictive transducer system described above converts the radial vibrations of the ring 52 to radial and longitudinal vibrations in the cylinder 53. The relation between the outer diameter D of the ring part to the first and second resonance frequencies is defined by Equation (1) above, with the $q_F$ values as being 2.0 and 6.67, respectively.

Figure 6:
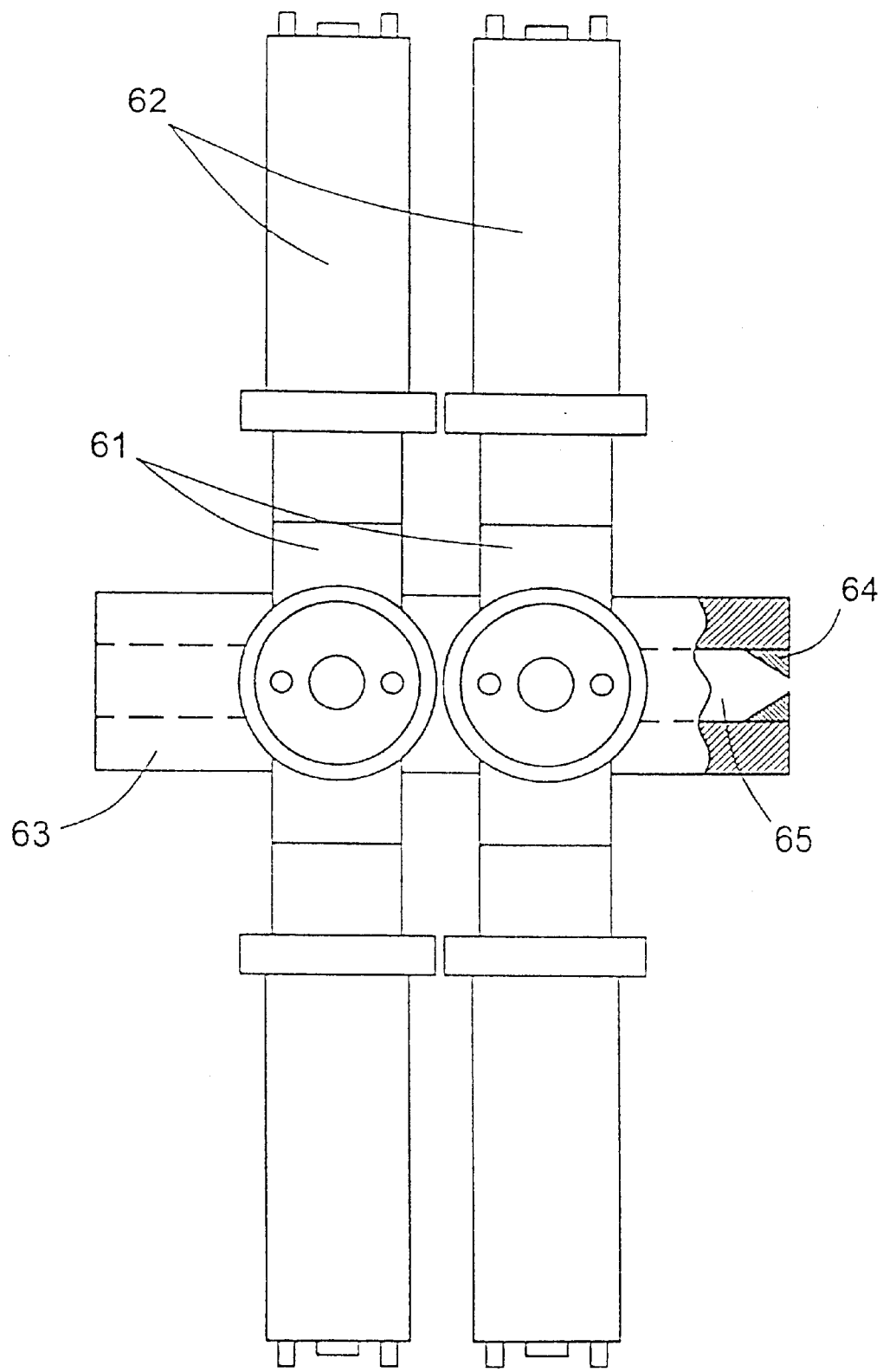
FIG. 6 shows a radial-longitudinal conversion system with multiple magnetostrictive units attached.

A further alternative is the combination of a ring part and rod magnetostrictive transducers, arranged in a plurality of banks in sequence along the length of the cylinder. An example is shown in FIG. 6, where two banks, each consisting of a ring set 61 with four rod transducers 62, are arranged along the length of the heavy-walled tube 63. A die 64 is placed at the outlet of the conduit. Crumb rubber 65 flowing through the conduit is treated by vibrating the tube walls, and the die at the outlet of the conduit is used to maintain pressure and to control the physical characteristics of the extrudate.

While the process of this invention is applicable to elastomers in general, it is of particular interest in the treatment of crumb rubber for devulcanization. Crumb rubber is formed from scrap rubber such as rubber tires in various ways. In general, the scrap rubber is first shredded by mechanical means, using a mechanical tire shredder such as a two-roll, grooved rubber mill. Further size reduction is achieved by ambient grinding or by the use of liquid nitrogen or other cryogenic fluids followed by pulverization, or by high-pressure water. The rubber is both shredded and separated from additional components included in the scrap, such as steel or other cording materials, by conventional means. Particle comminution to a size range of approximately 18 to 80 mesh (1.0 mm to 0.177 mm) is preferred. Fibers and metal pieces are removed by such methods as air sorting, vibration, and the use of magnets. All of these techniques are well known in the art. Best results are achieved with crumb rubber that meets the ASTM Test Method D5603-96 standard for chemical analysis and metals and fiber content.

Figure 7:
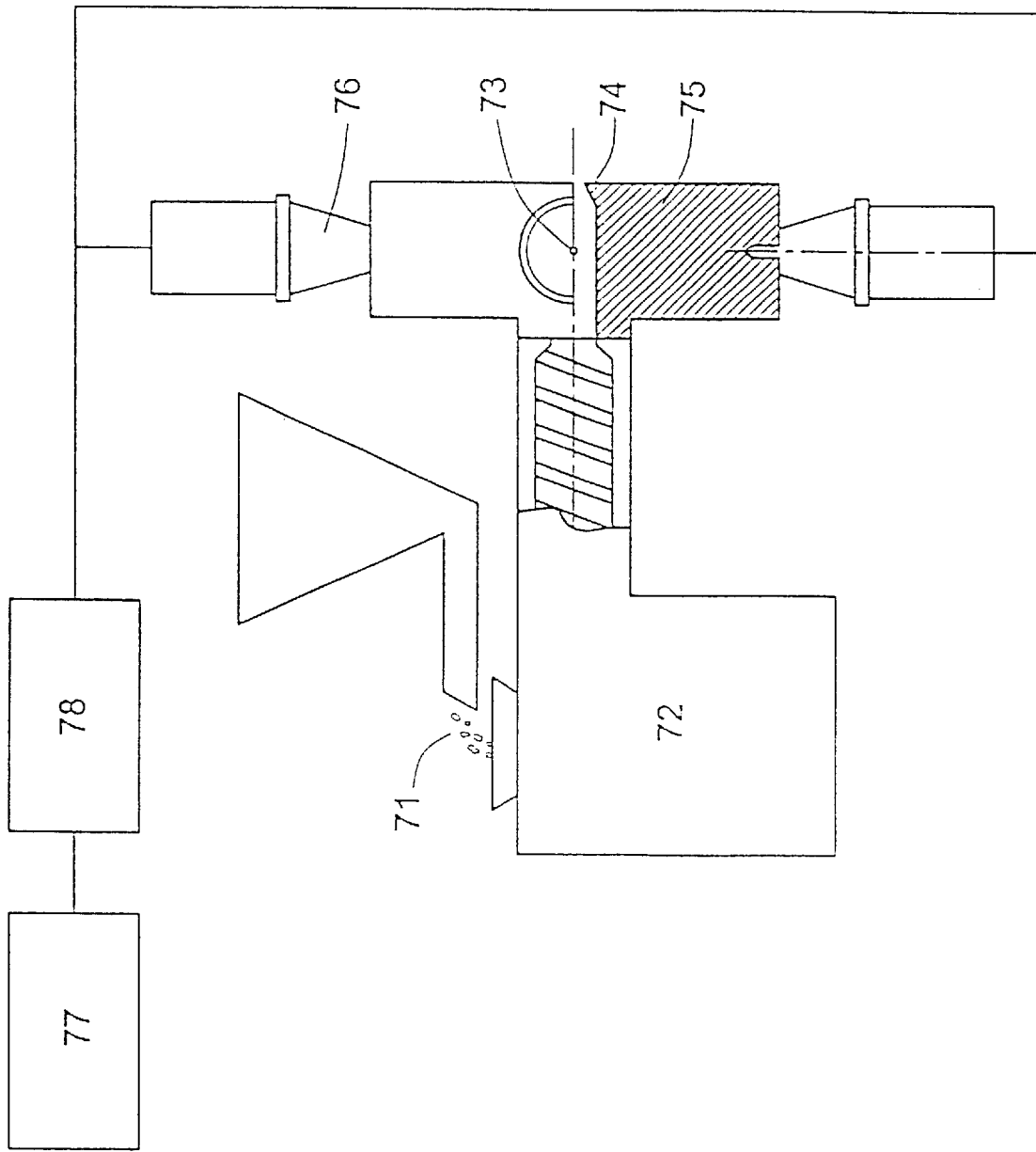
FIG. 7 is a process flow diagram illustrating all stages in the process of the invention.

Referring to FIG. 7, the crumb rubber 71 (or other elastomer) is preferably pressurized and preheated prior to exposure to the ultrasonic vibrations induced by the magnetostriction transducer. Pressurization assures that the crumb rubber is densely packed and that cavitation of sound waves is minimized. Pressurization is preferably in excess of 500 pounds per square inch (PSI) (34 atmospheres), and most preferably within the range of about 900 to about 1,000 PSI (61 to 68 atmospheres). Preheating improves the flowability of the mixture, and is preferably performed to a temperature within the range of about 240° F. to about 300° F. (116° C. to 149° C.), and most preferably about 250° F. (121° C.). Pressurization and preheating are conveniently performed in an extruder 72; which forces the material through a pipe conduit 73 and to leave the conduit through a die 74. A radially vibrating disk 75 is attached to the pipe conduit. The flowing elastomer is treated by alternating ultrasonic pressure. The ultrasonic vibrations of the disk 75 are excited by magnetostrictive transducers 76. The amplitude of ultrasonic pressure is most preferably within the range of about 1,000 to about 1,500 PSI (68 to 100 atmospheres). Preferred extruders are those that have at least a 15:1 length-to-diameter ratio, and most preferably a 22:1 ratio. A preferred material of construction for the ultrasonic transducers is Fe-Co alloy, and a preferred material for the disk is a titanium alloy. The system will typically also include a heating jacket (not shown), a power generator 77, a wattmeter 78, and a pressure gauge (not shown). In alternative arrangements, an R-L ultrasonic unit is used instead of the disk.

In preferred embodiments, the ultrasonic vibrations are transmitted from the magnetostriction transducers 76 to the flowing elastomer by way of a titanium alloy horn 75 immediately at or very close to the outlet of the extruder die 73. In alternative arrangements, the horn is an integral part of the wall of the conduit through which the reaction materials flow. The titanium alloy is preferably an alloy that contains at least about 90% titanium by weight. An example of such an alloy is one containing 94% titanium, 4% vanadium, and 2% either magnesium and iron or magnesium and cobalt (all percentages by weight and approximate).

Preferred alloys for the magnetostrictive transducer include TERFENAL-D, MD-1, PZT-8, or an alloy of 40% iron, 49% cobalt, 6% nickel, and 5% other metals (all percentages by weight and approximate), silver-brazed to a stainless steel plate, the alloy thickness being about 0.001 inch (0.0025 cm). Systems in accordance with this invention can be scaled up to 180,000 watts (particularly the type of system shown in FIG. 6) or operated at low power levels as desired.

The foregoing is offered primarily for purposes of illustration. Further modifications and substitutions that will be apparent to those skilled in the art can be made without departing from the spirit and scope of the invention.

We claim:

1. A continuous process for the devulcanization of vulcanized elastomeric material, said process comprising:

pressurizing said material and treating said material by cylindrical convergent waves while so devulcanizing with alternating ultrasonic pressure waves produced by a magnetostriction transducer at a power level and for a period of time sufficient to dissociate carbon and sulfur crosslinking bonds and devulcanizing said material at power levels scaled from about 15 KW to about 180 KW.

2. A process in accordance with claim 1 in which said vulcanized elastomeric material is in particulate form.

3. A process in accordance with claim 1 in which said vulcanized elastomeric material is crumb rubber.

4. A process in accordance with claim 1 in which said power level is from about 15,000 to about 180,000 watts of magnetostrictive ultrasound power.

5. A process in accordance with claim 1 further comprising preheating said material to a temperature of from about 240° F. to about 300° F. prior to treating said material with said ultrasonic waves.

6. A process in accordance with claim 1 in which said ultrasonic waves are at a frequency within the range of about 18 to about 30 kHz, and an amplitude of from about 1,000 to about 1,500 PSI.

7. A process in accordance with claim 1 in which said process is continuous and said treatment of said material is accomplished by passing said material through a conduit in a linear flow path along a flow axis while said ultrasonic waves are imposed in orientations that are radial relative to said flow axis.

8. A process in accordance with claim 7 in which said ultrasonic waves are orientations that are both radial and longitudinal relative to said flow axis.

9. A process in accordance with claim 7 in which said ultrasonic waves are imposed symmetrically around said flow axis.

10. A process in accordance with claim 7 in which said conduit is a metal pipe constructed of an alloy of titanium containing at least 90% titanium.

11. A process in accordance with claim 7 in which said ultrasonic waves are produced by a plurality of magnetostriction transducers arranged in a plurality of banks along said flow axis.

* * * * *